United States Patent [19]
Honig et al.

[11] Patent Number: 6,054,066
[45] Date of Patent: Apr. 25, 2000

[54] PROCESS FOR PREPARING A SODIUM PERCARBONATE PRODUCT

[75] Inventors: Helmut Honig, Geretsried; Manfred Mathes, Bad Hoenningen; Paul-Wilhem Fuchs, deceased, late of Bad Hoenningen, by Monika Ploetz, legal representative; Harald Beck, Epgert-Krunkel, all of Germany

[73] Assignee: Solvay Interox GmbH, Hannover, Germany

[21] Appl. No.: 08/849,511

[22] PCT Filed: Dec. 12, 1995

[86] PCT No.: PCT/EP95/04891

§ 371 Date: Oct. 2, 1997

§ 102(e) Date: Oct. 2, 1997

[87] PCT Pub. No.: WO96/19408

PCT Pub. Date: Jun. 27, 1996

[30] Foreign Application Priority Data

Dec. 22, 1994 [DE] Germany ............... 44 46 014

[51] Int. Cl.$^7$ .................................. C01B 15/10
[52] U.S. Cl. ............... 252/186.28; 510/309; 510/367; 510/435; 510/478; 510/509; 423/415.2
[58] Field of Search ................... 510/309, 367, 510/435, 478, 509; 252/186.28; 423/415.2

[56] References Cited

U.S. PATENT DOCUMENTS

| | | | |
|---|---|---|---|
| 4,117,087 | 9/1978 | Dillenburg et al. | 423/275 |
| 4,428,914 | 1/1984 | Brichard et al. | 423/265 |
| 5,294,427 | 3/1994 | Sasaki et al. | 423/415.2 |
| 5,720,896 | 2/1998 | Paterson et al. | 252/186.27 |

FOREIGN PATENT DOCUMENTS 732501 3/1943 Germany .

OTHER PUBLICATIONS

Firsova et al, "Reaction of Sodium Bicarbonate with Hydrogen Peroxide and Some Properties of the Compound Na2CO3 . 1.5H2O2". Inorganic and Analytical Chemistry, NS Kurnakov Institute of General and Inorganic Chemistry, Academy of Sciences of The USSR, No, Sep. 1968.

Firsova et al., "Reaction of Sodium Bicarbonate with Hydrogen Peroxide and Some Properties of the Compound $Na_2CO_3 \cdot 1.5\ H_2O_2$", *Inorganic and Analytical Chemistry*, NS Kurnakov Institute of General and Inorganic Chemistry, Academy of Sciences of the U.S.S.R., No. 9, Sep. 1968, pp. 1850–1853.

Krause et al., "Ueber die Bildung von Peroxycarbonat aus Natriumhydrogencarbonat in verduennten Wasserstoffperoxidloesungen—Kurze Originalmitteilungen", Institut fur Anorganische Chemie der Universitat Poznan, Poland, Feb. 1970, pp. 433–434.

*Chemical Abstracts*, vol. 70, Abstract No. 43483x, "Reaction of sodium bicarbonate with hydrogen peroxide and some properties of $Na_2CO_3 \cdot 1.5H_2O_2$," (1969) p. 509. No month given.

*Chemisches Zentralblatt*, No. 32–0711, "Reaktion von Natriumhydrogencarbonat mit Wasserstoffperoxid . . . " (1969) p. 66. No month given.

Abstract of Published Japanese Patent Application No. JP 71–14998. No date given.

Abstract of Published Japanese Patent Application No. JP 02–296705. No date given.

*Primary Examiner*—Mark Kopec
*Assistant Examiner*—Brian P. Mruk
*Attorney, Agent, or Firm*—Evenson, McKeown, Edwards & Lenahan, P.L.L.C.

[57] ABSTRACT

A process is disclosed for preparing a novel sodium percarbonate product useful in pH-regulated washing and cleaning systems. The disclosed sodium percarbonate product substantially is a mixed sodium percarbonate/sodium bicarbonate compound obtained by reacting, for example, sodium bicarbonate with an aqueous hydrogen peroxide solution.

13 Claims, No Drawings

PROCESS FOR PREPARING A SODIUM PERCARBONATE PRODUCT

DESCRIPTION

The invention relates to a process for the production of a novel sodium percarbonate product which can be used as an active oxygen-containing compound in pH-regulated washing and cleaning agent systems, in particular in the slightly alkaline pH range.

It is well known that peroxy compounds can be used as bleaching compounds in washing agent mixtures in powder form. In the usual household heavy-duty detergents, sodium perborate tetrahydrate or sodium perborate monohydrate is commonly used as the bleaching agent since these materials are relatively resistant to decomposition in pure washing agent media. However, with increasing frequency, other alkali metal peroxy salts, in particular peroxy carbonates such as sodium percarbonate (PCS) are being used. Commonly, PCS is produced e.g. from solutions (wet method). In this connection, it should not be forgotten that it is not a clearly defined homogeneous compound, but a mixture of compounds, some of which contain water of hydration, with e.g. the following formulae:

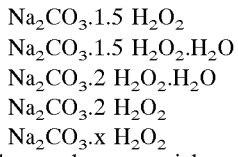

The usual commercial product has the average composition $2\ Na_2CO_3 \cdot H_2O_2$; from the chemical point of view PCS can therefore be more accurately referred to as sodium carbonate peroxyhydrate.

The use of peroxycarbonate (PCS) in washing agent and cleaning agent systems still causes some problems from the technical point of view of application. It has, for example, been found that the use of peroxycarbonate with the simultaneous application of bleaching agent activators such as TAED (tetraacetylethylenediamine) at a high pH of approximately 11 does not lead to an optimum bleaching effect in certain washing agent systems such as it is obtained, on the other hand, at a low pH of e.g. 8 to 9.

There is consequently a requirement for a sodium percarbonate-containing product which is not easily affected by the pH in modern washing and cleaning agent systems and is consequently able to develop an optimum bleaching effect. Moreover, the product should have a suitable active oxygen content and a good active oxygen stability and storage stability, in particular in the presence of other common washing agent and cleaning agent components.

This object is achieved by the process according to the invention detailed in the patent claims, the product according to the invention and its use according to the invention.

In particular, the invention relates to a process for the production of a mixed sodium percarbonate/sodium bicarbonate compound which is characterized in that a mixture of a starting product containing sodium bicarbonate and of an aqueous hydrogen peroxide solution is reacted with—at least slight—heating and that the mixed sodium percarbonate/sodium bicarbonate compound formed is obtained by simultaneous or subsequent drying. In the present process, products containing sodium bicarbonate which are known as such and are of synthetic or natural origin can be used. In particular, sodium bicarbonate with the formula $NaHCO_3$ can be used in the process according to the invention with particularly good results; this sodium bicarbonate is also referred to as sodium hydrogen carbonate. To be able to convert the sodium bicarbonate to sodium percarbonate, at least slight heating is required since only a slight reaction of the starting product to form sodium percarbonate is observed on mixing of the sodium bicarbonate-containing starting product with the aqueous hydrogen peroxide solution alone (e.g. at room temperature). Preferably, the mixture is reacted in particular with heating to a temperature of at least approximately 50° C. During this process, a genuine mixture of sodium percarbonate and sodium bicarbonate is formed which essentially contains no other reaction products; for example, a soda content of maximum approximately 1% by wt. has only been found in the present reaction products. Carbon dioxide ($H_2CO_3$) which is formed as a further reaction product is removed during the conversion or drying as a gaseous product, e.g. as $CO_2$, and water. The aqueous hydrogen peroxide solution which is used as further starting product can comprise any desired technical grade hydrogen peroxide solution with the usual hydrogen peroxide contents. For example, 35–85% by wt. hydrogen peroxide solutions can be used; these are available on an industrial scale in this range of concentration. The hydrogen peroxide solution can be stabilized against loss of active oxygen by means of standard stabilizers.

Heating does not only initiate the conversion of the starting products but the temperature selected for the conversion and/or drying process concerned also influences the active oxygen content and the grain size of the particulate product obtained. In general, an increase in granulation can be observed compared with the sodium bicarbonate-containing starting product used.

Although a certain amount of heating is sufficient for the conversion, this and/or drying is generally carried out at temperatures of 50–140° C., preferably at 80–120° C. In particular, the stoichiometric quantity of hydrogen peroxide (based on sodium bicarbonate) can be chosen in such a way that only part of the sodium bicarbonate is converted to sodium percarbonate during the reaction. The quantity of sodium bicarbonate remaining in the sodium percarbonate/sodium bicarbonate product will be selected by the expert in line with the pH-regulated washing and cleaning agent systems concerned. In particular, degrees of conversion of at least 30 mole %, preferably 40–60 mole % have proved appropriate. By means of such levels of conversion, active oxygen contents can be achieved in the mixed sodium percarbonate/sodium bicarbonate product, which are capable of developing a satisfactory stability and a steady effect in the washing and cleaning agent and, moreover, guarantee advantageous pH application properties.

Usually, it is possible to add additional active oxygen stabilizers before or during the conversion to the mixture of starting product containing sodium percarbonate and aqueous hydrogen peroxide solution, which is to be converted according to the invention. Organic phosphonate stabilizers, in particular, are preferred. The following can also be added as stabilizers, e.g. in the process, either separately or via the hydrogen peroxide: in particular, alkali metal or magnesium silicates, magnesium sulphate, phosphates (e.g. metaphosphate), organic stabilizers such as quinolinic acid, salicylic acid or dipicolinic acid (DPA), chelating agents such as 8-oxyquinoline or ethylenediaminetetraacetic acid (EDTA), phosphonic acid derivatives such as methylene or aminomethylene phosphonic acids or the salts thereof, in particular 1-hydroxy ethylidene diphosphonic acid (HEDP) and small quantities of the usual wetting agents. For example, in one practical example of the invention, HEDP (e.g as a 60% by wt, aqueous solution) is used. It is also possible to use salts, e.g. alkali metal salts, of this organic phosphonic acid as stabilizer.

On the one hand, the process according to the invention can be carried out in two steps, e.g. in one conversion step and a separate subsequent drying step. On the other hand, it is advantageously possible to carry out the conversion and drying simultaneously after the preparation of the mixture from starting product containing sodium bicarbonate and the aqueous hydrogen peroxide solution. For this purpose, the usual drying facilities are suitable. It is, for example, possible to carry out the conversion and the drying process in a circulating air dryer or in a fluid bed dryer. The previous manufacture of the mixture of sodium bicarbonate-containing starting product and aqueous hydrogen peroxide solution, which is to be converted, can be carried out in the usual way, the usual mixers being used; intensive mixers such as intensive mixers of the Lodige type have proved particularly advantageous.

According to the present method, mixed sodium percarbonate/sodium bicarbonate mixtures are obtained which are characterized by advantageous application properties in pH-regulated washing and cleaning agent systems. These products which can be obtained according to the process of the invention also represent a subject matter of the invention as does the use of these mixed sodium percarbonate/sodium bicarbonate compounds in washing and cleaning agents. Provided an appropriate selection of the granulation of the starting products is made, the mixed sodium percarbonate/sodium bicarbonate compounds according to the process of the invention are suitable, as regards their grain size, for direct use in washing and cleaning agents or they can, if desired, be brought in line with the grain size distribution of other washing and cleaning agent components by sieving to adjust the required grain size distribution. If desired, the particulate product can be provided with a coating for peroxy compounds in the usual manner.

The following example is to explain the invention in further detail without limiting its scope.

EXAMPLE 2 kg sodium bicarbonate with a grain fraction of 0.2 to 1.0 mm were introduced into an intensive mixer of the Lodige type and quantity of 415 g hydrogen peroxide (aqueous, 70% by wt., to which 9.5 ml Turpinal SL had been added) was added within 2 minutes at 60° C. The mixture was subsequently mixed further intensively for another 4 minutes. Subsequently, the reaction mixture was transferred into a fluid bed dryer and dried at a temperature of the input air of 85° C. and a temperature of the discharge air of 70° C.

A granular product with a grain size of between 0.15 and 1.4 mm was obtained; the hydrogen peroxide yield was 90%. The analysis of the end product shows that the product consisted essentially merely of sodium bicarbonate and sodium percarbonate (soda content<1%). The active oxygen content of the product was 6.7

Turpinal SL=aqueous 60% by wt. solution of 1-hydroxyethylidene diphosphonic acid (HEDP)

What is claimed is:

1. A process for the production of a mixed percarbonate/sodium bicarbonate compound, said process comprising:

reacting a reaction mixture of sodium bicarbonate with a sufficient quantity of an aqueous hydrogen peroxide solution to convert 40 to 60 mole-% of the sodium bicarbonate to sodium percarbonate, wherein said reacting is carried out under heating to a temperature of at least 50° C., and a mixed sodium percarbonate/sodium bicarbonate compound is formed, and drying the reaction mixture to recover the mixed sodium percarbonate/sodium bicarbonate compound, wherein said mixed sodium percarbonate/sodium bicarbonate compound comprises about 60–40 mol % sodium bicarbonate and about 40–60 mol % sodium percarbonate.

2. A process according to claim 1, wherein said reacting and said drying are carried out simultaneously.

3. A process according to claim 1, wherein said drying is carried out subsequent to said reacting.

4. A process according to claim 1, wherein the reaction mixture is reacted at a temperature of from 50° C. to 140° C.

5. A process according to claim 4, wherein the reaction mixture is reacted at a temperature of from 80° C. to 120° C.

6. A process according to claim 1, wherein said reacting and said drying are carried out simultaneously in a single process step.

7. A process according to claim 6, wherein said reacting and said drying are carried out simultaneously in a fluidized bed dryer.

8. A process according to claim 1, further comprising adding a stabilizer for active oxygen compounds to the reaction mixture.

9. A process according to claim 8, wherein said stabilizer comprises an organic phosphonic acid.

10. A process according to claim 8, wherein the stabilizer is added prior to said reacting step.

11. A process according to claim 8, wherein the stabilizer is added during the reacting step.

12. A mixed percarbonate/sodium bicarbonate compound produced by the process of claim 1.

13. A pH-regulated washing or cleaning composition comprising a mixed percarbonate/sodium bicarbonate compound produced by the process of claim 1, and at least one detergent.

* * * * *